(12) United States Patent
Schecter et al.

(10) Patent No.: US 12,095,307 B2
(45) Date of Patent: *Sep. 17, 2024

(54) VERSATILE UNINTERRUPTABLE POWER SUPPLY

(71) Applicant: Solaredge Technologies Ltd., Herzeliya (IL)

(72) Inventors: Natan Schecter, Jerusalem (IL); Yehuda D. Levy, Jerusalem (IL); Aryeh Zafranski, Jerusalem (IL); Alexander Savernin, Maale Adumim (IL); Anatoly Granaturov, Maalot-Tarshiha (IL); Tomer Kugman, Betar Illit (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/322,761

(22) Filed: May 24, 2023

(65) Prior Publication Data

US 2024/0006913 A1    Jan. 4, 2024

Related U.S. Application Data

(63) Continuation of application No. 17/838,987, filed on Jun. 13, 2022, now Pat. No. 11,715,974, which is a continuation of application No. 17/149,894, filed on Jan. 15, 2021, now Pat. No. 11,381,108.

(60) Provisional application No. 62/961,546, filed on Jan. 15, 2020.

(51) Int. Cl.
*H02J 9/06*    (2006.01)

(52) U.S. Cl.
CPC .................................. *H02J 9/062* (2013.01)

(58) Field of Classification Search
CPC .... H02J 9/062; H02J 3/007; H02J 3/38; H02J 9/068

See application file for complete search history.

(56) References Cited

U.S. PATENT DOCUMENTS

| | | | |
|---|---|---|---|
| 6,215,279 B1 | 4/2001 | Rakovski et al. | |
| 7,671,538 B2 | 3/2010 | Zilberberg | |
| 7,804,194 B2 | 9/2010 | Zilberberg | |
| 8,354,829 B2 | 1/2013 | Zilberberg | |

(Continued)

FOREIGN PATENT DOCUMENTS

| | | |
|---|---|---|
| JP | 2014110665 A | 6/2014 |
| WO | 2010126220 A2 | 11/2010 |

(Continued)

OTHER PUBLICATIONS

May 6, 2021—European Search Report—EP 21151834.5.

*Primary Examiner* — Elim Ortiz
(74) *Attorney, Agent, or Firm* — Banner & Witcoff, Ltd.

(57) ABSTRACT

Systems, apparatuses, and methods are described for a versatile UPS. The versatile UPS is operative to provide power to a load and to an interconnected network for delivering electricity from producers to consumers (i.e., an electricity grid, or simply, "a grid"). The versatile UPS has a plurality of switches providing for a multiplicity of switching states. The output to the load, the grid, or both is dependent, at least in part, on the switching states. Related systems, methods and apparatus is also described.

20 Claims, 7 Drawing Sheets

(56) References Cited

U.S. PATENT DOCUMENTS

| | | |
|---|---|---|
| 8,536,848 B2 | 9/2013 | Zilberberg |
| 8,866,459 B2 | 10/2014 | Zilberberg |
| 9,570,938 B2 | 2/2017 | Zilberberg et al. |
| 10,014,719 B2 | 7/2018 | Zhang |
| 2004/0084965 A1* | 5/2004 | Welches .............. H02J 3/30 |
| | | 307/64 |
| 2006/0175904 A1* | 8/2006 | Powell .............. H02J 9/062 |
| | | 307/66 |
| 2009/0021079 A1* | 1/2009 | Johnson, Jr. .......... H02J 9/062 |
| | | 307/68 |
| 2012/0013193 A1* | 1/2012 | Sato .............. H02J 9/062 |
| | | 307/80 |
| 2014/0368043 A1* | 12/2014 | Colombi .............. H02J 3/1864 |
| | | 307/66 |
| 2016/0079807 A1 | 3/2016 | Nguyen |
| 2018/0102647 A1* | 4/2018 | Ohnishi .............. H02J 9/06 |
| 2019/0280520 A1* | 9/2019 | Zhang .............. H02J 9/062 |

FOREIGN PATENT DOCUMENTS

| | | |
|---|---|---|
| WO | 2012137210 A2 | 10/2012 |
| WO | 2014041523 A2 | 3/2014 |

* cited by examiner

VERSATILE UNINTERRUPTABLE POWER SUPPLY

CROSS-REFERENCE TO RELATED APPLICATIONS

This application is a continuation of U.S. application Ser. No. 17/838,987, filed Jun. 13, 2022, which is a continuation of Ser. No. 17/149,894, filed Jan. 15, 2021 (now U.S. Pat. No. 11,381,108), which is a non-provisional of and claims benefit of U.S. Provisional Patent Application No. 62/961,546, filed Jan. 15, 2020, which are hereby incorporated by reference in their entireties.

BACKGROUND

An uninterruptible power supply (UPS, sometimes referred to as an uninterruptible power source) is one of a category of power supplying devices that provides power to a load upon failure of an input power source, such as a power grid. UPS devices typically provide protection from input power interruptions by providing the load with power, which is typically stored in a battery, a super-capacitor, a flywheel, or other appropriate energy storage device.

Run-time of the UPS may be short (typically limited by storage capacity of the battery, super-capacitor, flywheel, or other appropriate storage device), but may provide sufficient time to either restore power from the power grid or to properly shut down the load.

SUMMARY

The following summary presents a simplified summary of certain features. The summary is not an extensive overview and is not intended to identify key or critical elements.

Systems, apparatuses, and methods are described for a versatile UPS. The versatile UPS may be operative to provide power to a load and/or to an interconnected network for delivering electricity from producers to consumers (e.g., an electricity grid, or simply, a/the "grid"). In such a case, power may be sold to an owner or operator of the grid by the consumer. The versatile UPS has a plurality of switches providing for a multiplicity of switching states. The output to the load, the grid, or both is dependent, at least in part, on the switching states.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
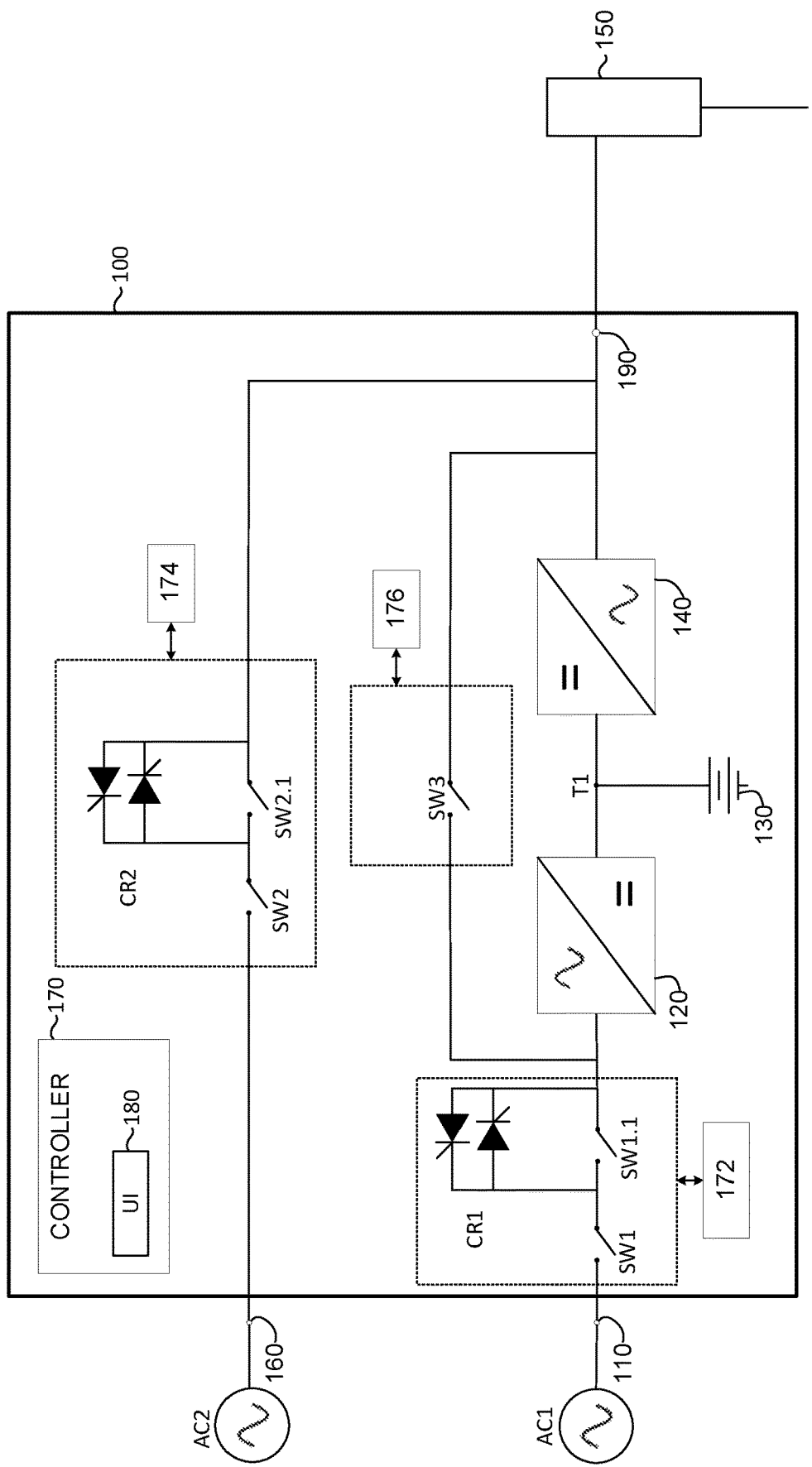
FIG. 1 shows an example UPS.

The accompanying drawings, which form a part hereof, show examples of the disclosure. It is to be understood that the examples shown in the drawings and/or discussed herein are non-exclusive and that there are other examples of how the disclosure may be practiced.

Reference is now made to FIG. 1, which shows an example of a UPS 100. The UPS 100 comprises a first terminal 110 for receiving a first alternating current (AC) electricity input, for example, from an electrical power grid (e.g., an interconnected network for delivering electricity from producers and suppliers to consumers). The first terminal 110 may be connected to a first power converter 120, which includes an AC terminal and a direct current (DC) terminal. The first power converter 120 converts AC electricity received on the AC terminal from the first AC electricity input to direct current (DC) electricity on the DC terminal. The first power converter 120 may comprise a bidirectional inverter that also converts DC electricity received on the DC terminal to AC electricity on the AC terminal. A first switch SW1 may be disposed between the first terminal 110 and the AC terminal of the first power converter 120. SW1 may comprise any of a relay, a transistor (for example, a MOSFET or an IGBT), a contactor switch, or any other appropriate switch. The operation of the first switch SW1 is described below. A second switch, SW1.1 may also be included in series to SW1 (e.g., between SW1 and the AC terminal of first power converter 120). A first silicon controlled rectifier (sometimes referred to as a semiconductor-controlled rectifier) (SCR), labelled CR1 in FIG. 1 may be connected in parallel with SW1.1. As with SW1, SW1.1 may comprise any of a relay, a transistor (e.g., a MOSFET or an IGBT), a contactor switch, or any other appropriate switch. The term first switch circuit as used herein means the switch SW1, the switch SW1.1, and the SCR CR1. Similarly, the term second switch circuit as used herein means the switch SW2, the switch SW2.1, and the SCR CR2.

The first silicon controlled rectifier, CR1 (and a second silicon controlled rectifier, CR2, discussed below), are depicted as two anti-parallel silicon controlled rectifiers. Such an arrangement enables CR1 and CR2 to function as a switch, enabling the UPS device 100 to effect a near instantaneous transition from providing power from one or more of the AC power sources to a load 150 (described below) to providing power from a battery 130 (described below) to the load 150.

The first power converter 120 may comprise a bidirectional inverter and may process DC power, which may be stored in the battery 130, and may process AC power provided by a grid or AC power provided to the load, for example 150. The load 150 may connect to the UPS 100 at a terminal, for example terminal 190. Terminal 190 is depicted as being in the UPS device 100, although in practice, the terminal may be disposed in an external wall of the UPS device 100, or externally to the UPS device 100. The term "battery" as used herein refers to any appropriate energy storage device, for example, an electrochemical battery (e.g., Li-ion battery), a fuel cell, a super-capacitor, a flywheel, etc. In one mode of operation, the first power converter 120 may operate as an inverter, converting DC electricity (e.g., from the battery 130) to AC electricity. In a second mode of operation, the first power converter 120 may operate as a DC-to-AC converter (e.g., a full-bridge rectifier, buck converter, boost converter), converting AC electricity (e.g., from the grid) to DC electricity. The battery 130 may serve as a source of auxiliary power when the UPS needs to provide power at an output, as will be described below. The battery 130 and a DC terminal of the first power converter 120 connect to a common terminal T1. Common terminal T1 may be further connected to a second power converter 140. The second power converter 140 may comprise a bidirectional inverter, which in a first mode of operation, may operate as an inverter, converting DC electricity (e.g., from the battery 130) to AC electricity (which may be provided to the grid, as explained below). In a second mode of operation, the second power converter 140 may operate as a AC-to-DC converter, converting AC electricity (e.g., from the grid) to DC electricity, similar to the first power converter 120. An AC terminal of the second power converter 140 may be coupled (e.g., connected via switches) to the load 150. In response to no first AC electricity input being received at the first terminal 110 (e.g., because of a power failure), the first power converter 120 and/or the second power converter 140 may provide power to load 150, for example by converting DC electricity from battery 130 to AC electricity. Using this electrical power, for example, load 150 may continue operation until either input AC electricity is restored, the load 150 may be shut down, or the battery 130 drains to a point where the load 150 may be unable to operate further. The load 150 may be within a specified rating of the UPS 100. Namely, if the UPS is rated to provide output power of 18 kVA, then for example, power requirements of the load 150 does not exceed 18 kVA.

In one mode of operation, the first power converter 120 and/or the second power converter 140 may each operate as an AC-to-DC converter, converting AC electricity received on the AC terminal to DC electricity on the DC terminal. In a second mode of operation, each of the first power converter 120 and/or the second power converter 140 may operate as a DC-to-AC circuit (also known as an inverter circuit), converting DC electricity received on the DC terminal to AC electricity on the AC terminal. A controller 170, may control the modes of operation of the first power converter 120 and/or the second power converter 140 of the UPS 100, for example by controlling modes or states of the first power converter 120, the second power converter 140, and/or circuitries of switches (such as CR1, CR2, SW1, SW1.1, SW2, SW.2.2, and/or SW3). Alternatively or additionally, controller 170 may comprise a high-level controller, which controls a plurality of lower-level controllers, such as controllers 172, 174, 176 shown in FIG. 1. Elements controlled by lower-level controllers 172, 174, 176 are, for example, surrounded by a dotted line forming a rectangle. First lower-level controller 172 may receive one or more operational commands (e.g., signals, messages) from the high-level controller 170, for example, regarding states of operation of the UPS 100 and/or states of operation of a first switch circuit (such as CR1, SW1 and/or SW1.1). The first lower-level controller 172 may then operate the first switch circuit (such as SW1, SW1.1, and CR1), configuring them appropriately to a particular mode of operation (described below). Additional lower level controllers (not depicted) may control modes of operation of the first power converter 120, and the second power converter 140 based on commands from controller 170.

The UPS 100 may comprise a second terminal 160 for receiving a second AC electricity input from, for example, the electrical power grid (similar to first terminal 110). The second terminal 160 may be connected to a switch SW2 which, when closed (ON), connects the second terminal 160 to the load 150, for example, thus providing AC electricity directly to the load. SW2 may, in some examples of operation, be connected to the electrical power grid via the first terminal 110. In such a case, however, power provided at the first terminal 110 would need to be double what it would be in a case where SW2 is connected to the electrical power grid via the second terminal 160. Another switch, SW2.1, may also be included in series to SW2 (e.g., between SW2 and the load 150). A second SCR, labelled CR2 in FIG. 1 may be connected in parallel with SW2.1. SW2 and SW2.1 may comprise any of a relay, a transistor (e.g., a MOSFET, an IGBT), a contactor switch, or any other appropriate switch. Second lower-level controller 174 may receive one or more operational commands (e.g., signals, messages) from the high-level controller 170, for example, regarding states of operation of the UPS 100 and/or states of operation of a second switch circuit (such as CR2, SW2 and/or SW2.1). The second lower-level controller 174 may then operate the second switch circuit (such as SW2, SW2.1, and CR2), configuring them appropriately to a particular mode of operation (described below).

In some variations of the system in FIG. 1, a conduction path may be provided and comprises a third switch SW3 connected between the AC terminal of circuit 120 (or to switch 1.1) and the AC terminal of circuit 140 (or to load 150), the operation of which may be explained below, along with the operation of UPS 100. For example, the conduction path bypasses circuit 120 and circuit 140. SW3 may comprise any of a relay, a transistor (e.g., a MOSFET, an IGBT), a contactor switch, or any other appropriate switch. Third lower-level controller 176 may receive one or more operational commands (e.g., signals, messages) from the high-level controller 170, for example, regarding states of operation of the UPS 100 and or states of operation of SW3. The third lower-level controller 176 may then control the operation of SW3, configuring based on the one or more operational commands, for example, in accordance with a particular mode of operation (described below).

UPS 100 may operate as a standby UPS, e.g., comprising external electrical power source intended to replace primary power in the event of primary power failure. A standby UPS draws AC power, for example, from a wall outlet, and switched to drawing power from a battery within a few milliseconds based on a power failure (e.g., in response to detecting a loss of AC power). UPS 100 may provide protection against transient voltage spikes and may provide battery backup, based on a power failure, e.g., in response to an AC power source ceasing to provide power. Alternatively or additionally, UPS 100 may operate as an on-line UPS, in which case, UPS 100 provides power to the load 150 whether or not there is an AC input. UPS 100 may be configurable to operate in a first mode as an on-line UPS, and in a second mode, as a standby UPS. A description of an example of how the UPS 100 may be configured is provided below, with reference to FIG. 3.

The controller 170, which may be programmed microcontroller (e.g., with memory storing instructions readable by the microcontroller) or a specially designed silicon chip (e.g., ASIC, FPGA) to operate the switches of the first and second switch circuit (such as SW1, SW1.1, SW2, SW2.1, SW3, the CR1, CR2), as well as switches and modes of operation of the first power converter 120, and the second power converter 140. In implementations where the controller 170 comprises a high level controller, as discussed above, and the various switches of the first and second switch circuit (such as SW1, SW1.1, SW2, SW2.1, and SW3) are controlled in one variation, respectively by first lower-level controller 172, second lower-level controller 174, and third lower-level controller 176. The first lower-level controller 172, the second lower-level controller 174, and the third lower-level controller 176 may be an appropriately programmed microcontroller (e.g., with memory storing instructions readable by the microcontroller) or a specially designed silicon chip (e.g., ASIC, FPGA) to operate the switches SW1, SW1.1, SW2, SW2.1, SW3, the CR1, CR2. While lower-level controllers 172, 174, and 176 are illustrated in FIG. 1 for controlling certain components of UPS 120, other variations may include more or less lower-level controllers, each controlling different combinations of SW1, SW1.1, SW2, SW2.2, SW3, 120 and/or 140.

Alternatively or additionally, a data communication signal may be used, for example, over a wired or a wireless network, to deliver a command to enter into or change from one particular mode of operation of the UPS 100 to another. Still further alternatively, a device having computing power (e.g., microcontroller and memory storing instructions executable by the microcontroller) may control the choice of mode of operation of the UPS 100 without a hum an user intervening in the control of the UPS 100.

In accordance with the above, examples of switching states may be summarized as follows, in Table 1 and Table 2. In Table 1, a one (1) indicates either a closed switch state or an operative SCR state, as appropriate to a given cell. A zero (0) indicates either an open switch state or a non-operative SCR state, as appropriate to a given cell.

TABLE 1

| Operation Mode | Description | SW1 | SW1.1 | CR1 | SW2 | SW2.1 | CR2 | SW3 |
|---|---|---|---|---|---|---|---|---|
| First Mode | Normal mode, On-line UPS | 1 | 1 | 0 | 1 | 0 | 0 | 0 |
| Second Mode | Bypass mode, On-line UPS | 1 | 1 | 0 | 1 | 0 | 1 | 0 |
| Third Mode | Backup mode, double power, standby UPS | 0 | 0 | 0 | 0 | 0 | 0 | 1 |
| Fourth Mode | Backup mode, single power | 0 | 0 | 0 | 0 | 0 | 0 | 0 |
| Fifth Mode | Energy storage mode, double power | 1 | 1 | 0 | 1 | 1 | 0 | 0 |
| Six Mode | Energy storage mode double power with UPS ability | 1 | 0 | 1 | 1 | 0 | 1 | 1 |
| Seventh Mode | Backup mode and Energy Storage Together | 1 | 1 | 0 | 0 | 0 | 0 | 0 |
| Eighth Mode | Partial Energy storage mode with a single power UPS (option 1) | 1 | 1 | 0 | 1 | 0 | 0 | 0 |
| Ninth Mode | Partial Energy storage mode with a single power UPS (option 2) | 0 | 0 | 0 | 1 | 1 | 0 | 0 |
| Tenth Mode | Energy path only to AC 2 | 0 | 0 | 0 | 1 | 0 | 1 | 0 |

In Table 2, operation of the first power converter 120 and the second power converter 140 are described as converting AC power to DC power (AC/DC) or as being in standby mode. The source of power to the load 150 identifies whether power is provided to the load 150 from AC1, AC2, the battery 150, or some combination of all or some of AC1, AC2, the battery 150. Battery state specifies the operation of the battery in a given mode, for instance, charging, discharging, or no operation.

TABLE 2

| Operation Mode | Description | First Power Converter 120 | Second Power Converter 140 | Source of Power to Load 150 | Battery 130 State |
|---|---|---|---|---|---|
| First Mode | Normal mode: On-line UPS | AC/DC | DC/AC | From AC1 and/or battery | Charging or discharging or nothing |
| Second Mode | Bypass mode, On-line UPS | AC/DC | STANDBY | AC2 | Charging |
| Third Mode | Backup mode, double power, standby UPS | DC/AC | DC/AC | Battery only via the first power converter 120 and the second power converter 140 | Discharging |

TABLE 2-continued

| Operation Mode | Description | First Power Converter 120 | Second Power Converter 140 | Source of Power to Load 150 | Battery 130 State |
|---|---|---|---|---|---|
| Fourth Mode | Backup mode, single power | STANDBY | DC/AC | Battery only via the first power converter 120 and the second power converter 140 | Discharging |
| Fifth Mode | Energy storage mode, double power | AC/DC or DC/AC | AC/DC or DC/AC | AC2 | Charging or discharging or nothing |
| Sixth Mode | Energy storage mode double power with UPS ability | AC/DC or DC/AC | AC/DC or DC/AC | AC2 | Charging or discharging or nothing |
| Seventh Mode | Backup mode and Energy Storage Together | AC/DC or DC/AC | DC/AC | AC1 and/or Battery | Charge or discharge or nothing |
| Eighth Mode | Partial Energy storage mode with a single power UPS (option 1) | AC/DC or DC/AC | DC/AC | AC1 and/or BATTERY | Charge or discharge or nothing |
| Ninth Mode | Partial Energy storage mode with a single power UPS (option 2) | STANDBY | DC/AC or AC/DC or STANDBY | AC2 and/or BATTERY | Charge or discharge or nothing |
| Tenth Mode | Energy path only to AC 2 | STANDBY | DC/AC or AC/DC or STANDBY | AC2 and/or BATTERY | Charge or discharge or nothing |

For example, and without limiting the generality of the foregoing, the modes in Table 1 are as follows:

Normal Mode (First Mode)—AC electricity input to the UPS 100 is within specified tolerances of the UPS 100; the battery 130 is charged or charging; and the load 150 is within a specified rating of the UPS 100. In normal mode, UPS 100 may operate as an on-line UPS. In this mode, the UPS 100 receives input AC power at the first terminal 110 and at the second terminal 160.

It is understood that all discussions of AC input refer to an AC input within predetermined tolerances for a given UPS device 100. By way of example, the UPS device 100 may be rated to receive up to 400 V AC±10% as a single phase AC input. By way of another example, the UPS device 100 may be rated to receive up to 400 V AC×3 as a three phase UPS device±10%. In the above examples, the tolerance of ±10% is also given by way of example. In some UPS devices 100, other tolerances may be found, e.g., ±15%, ±8%, +10%-7%, and so forth. If the grid is no longer able, for whatever reason, to provide the full power rating and its tolerance (e.g. if the UPS device 100 is rated to receive 400 V AC±10%, and the grid is only able to provide 350 V AC), the input power is derated (e.g., 200V at 10 A), and the UPS continues to operate accordingly. Optionally, the UPS device 100 may enter stored energy mode, and not provide an output to the load if the grid is no longer able to provide the full rating However, if the grid exceeds the full power rating e.g. if the UPS device 100 is rated to receive 400 V AC±10%, and the grid is now providing 450 V AC), the UPS device 100 may shut down.

Additionally, the battery 130 remains charged (or is recharging). That is to say, the UPS 100 is providing AC power to the load 150, as will now be explained. Switches SW1 and SW1.1 may both be closed, and so, power may be provided to the first power converter 120, which converts the AC input power to DC power inputted to second power converter 140 and (optionally) inputted to battery 130. The second power converter 140 may convert the DC power to AC output power inputted to the load 150.

Bypass Mode (Second Mode)—the current path through the UPS 100 into the load 150 does not go through the first power converter 120 and the second power converter 140. Rather, the first power converter 120 and the second power converter 140 are bypassed, and the current path to the load 150 is via the second AC terminal 160 via switch SW2 and CR2. In bypass mode, switch SW1 may be closed and SW1.1 closed, providing a current path into not including CR1. Switch SW2 may be closed and SW2.1 opened, providing a current path power via CR2. In this case, should there be a power failure, CR2 may disconnect and the UPS may convert power stored by battery 130 in order to provide power to the load 150. Switch SW3 may be closed, so that power from AC1 and AC2 may bypass the first power converter 120 and the second power converter 140, and reach the load 150. The first power converter 120 and the second power converter 140 may both function to charge the battery 130 using power from the first terminal 110 and second terminal 160. The UPS functions as a standby UPS, only switching into providing power from the battery 130 to the load 150 via circuit 140 if based on a loss of AC power at the first terminal 110.

In Backup mode, double power, standby UPS (Third Mode)—switch SW3 may be closed, and at least switches SW1 and SW2 are open. Thus, power may be provided to the load 150 via both the first power converter 120 and the second power converter 140 from the battery 130. Since the battery 130 may be providing power to the load 150, there might not be need for CR1 and CR2 to enable switching to the UPS 100 to rapidly provide power to the load 150.

In Backup mode, single power (Fourth Mode)—switches SW1, SW1.1, SW2, SW2.1, and SW3 are all open. Power is provided to the load 150 from the battery 130 via the second power converter 140.

Energy Storage Mode, double power (Fifth Mode)—AC electricity input to the UPS 100 is disconnected, not within specified tolerances of the UPS 100 and the battery 130 is outputting power (as will be detailed below); and the load 150 is within a specified rating of the UPS 100 itself. In Stored Energy mode, power from stored energy, is provided to the grid, as will now be explained. Switches SW1, SW1.1, SW2, and SW2.1 may all be closed. CR1 and CR2 may both be off. Power is provided to the load 150 from the second terminal 160, via switches SW2 and SW2.1. The battery 130 may provide power to the first power converter 120, which in turn provides an output via switches SW1 and SW1.1 to the grid.

In the Energy Storage mode, double power with UPS ability (Sixth Mode)—SW1 may be closed and SW1.1 opened, providing a current path to CR1. Switch SW2 is closed and SW2.1 opened, providing a current path to CR2. SW2.1 is open, so that power can flow bidirectionally from the second circuit 140 and second terminal 160. Since CR1 and CR2 are both in the current path, a rapid activation of the UPS by providing power from the battery 130 to the load 150 may be possible, if necessary. Power may flow from the first power converter 120 to the first terminal 110. Since switch SW1.1 is open, switch SW3 may be open as well, which may prevent power from flowing from the second terminal 160 into first terminal 110.

In Backup mode and Energy Storage Together (Seventh Mode)—SW1 and SW1.1 are closed, SW2, SW2.1, and SW3 are open, so that if there is a failure of AC2, AC1 continues to provide power. Power may then be provided to the load via the second circuit 140, and to the AC1 grid via the first power converter 120.

In the Partial Stored Energy single power mode with a single power UPS (option 1) (Eighth Mode)—switches SW1 and SW1.1 are both closed. Accordingly, the first power converter 120 is providing power to the grid from the battery 130. The second circuit 140 is providing power from the battery 130 to the load 150. Since the battery 130 is providing power to the load 150, switches SW2, SW2.1, SW3 and the two SCRs CR1 and CR2 may be open/off. The switch states of partial Stored Energy single power mode, (option 1) is similar to both the backup mode and Energy Storage Together and Normal mode. However, in Normal mode, the first power converter 120 is operating in a unidirectional manner, converting AC power to DC power, and providing the DC power to the battery 130 at terminal T1. In the backup mode and Energy Storage Together, the first power converter 120 and the battery 130 are not bypassed, and there is storage of energy in the battery 130. In the partial Stored Energy single power mode, (option 1), the first power converter 120 and the battery 130 are bypassed, and the first power converter 120 operates bidirectionally, so power may be provided to AC1.

In the Partial Stored Energy mode with a single power UPS (option 2) (Ninth Mode)—switches SW1 and SW1.1 are both open and switches SW2 and SW2.1 are both closed. The second circuit 140 may providing power from the battery 130 to the load 150 and AC2.

In the Energy path only to AC 2 mode (Tenth Mode)—the switches SW1, SW1.1, CR1, SW2.1 and SW3 are open/off, and switches SW2 and CR2 are closed/on. In this mode an energy path is provided from AC2 to the load 150 through CR2.

Figure 1A:
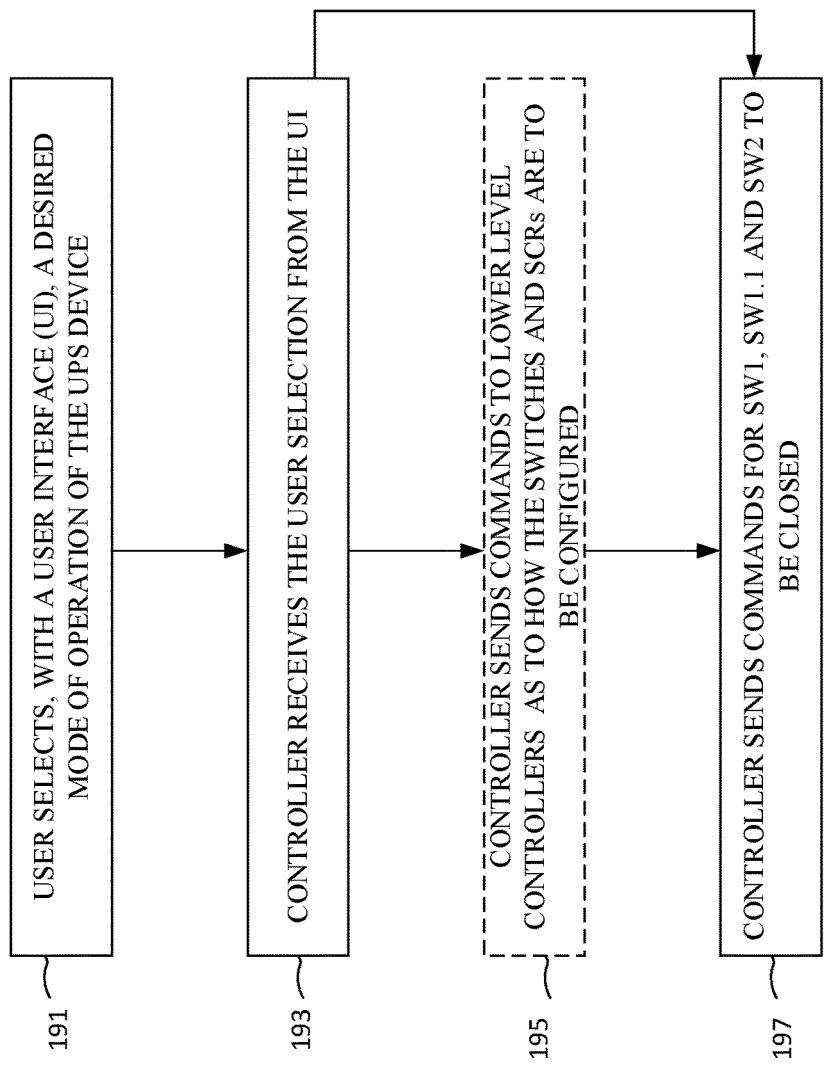
FIG. 1A is a flow chart providing an example of operation of the UPS 100 with the UI 180.

Reference is made to FIG. 1A which is a flow chart providing an example of operation of the UPS 100 with the UI 180. A user may interact with the UI 180 to select one of the modes described above (for example, "normal mode") as a desired mode of operation of the UPS device 100 (step 191). The controller 170 receives the user selection from the UI 180, and in the presence of the lower level controllers (for example, 172, 174, 176) (step 193), sends appropriate commands (for example, over a communications bus) to the lower level controllers as to how the various switches, SCRs, and power conversion circuits are to be configured (step 195, optional). In the absence of the lower level controllers, the controller 170 may communicate directly with the switches, SCRs, and power conversion circuits to be configured (step 197). For example, in normal mode, the controller 170 sends commands for SW1, SW1.1, and SW2 to be closed (or, in the absence of lower level controllers, directly causes SW1, SW1.1, and SW2 to be closed), and for CR1, SW2.1, CR2, and SW3 to be open (OFF), for first power converter 120 to convert AC power to DC power, and for second circuit 140 to convert DC power to AC power. A similar process may be followed to appropriately configure the UPS for other modes of operation, as per user selection via the UI 180.

Figure 2:
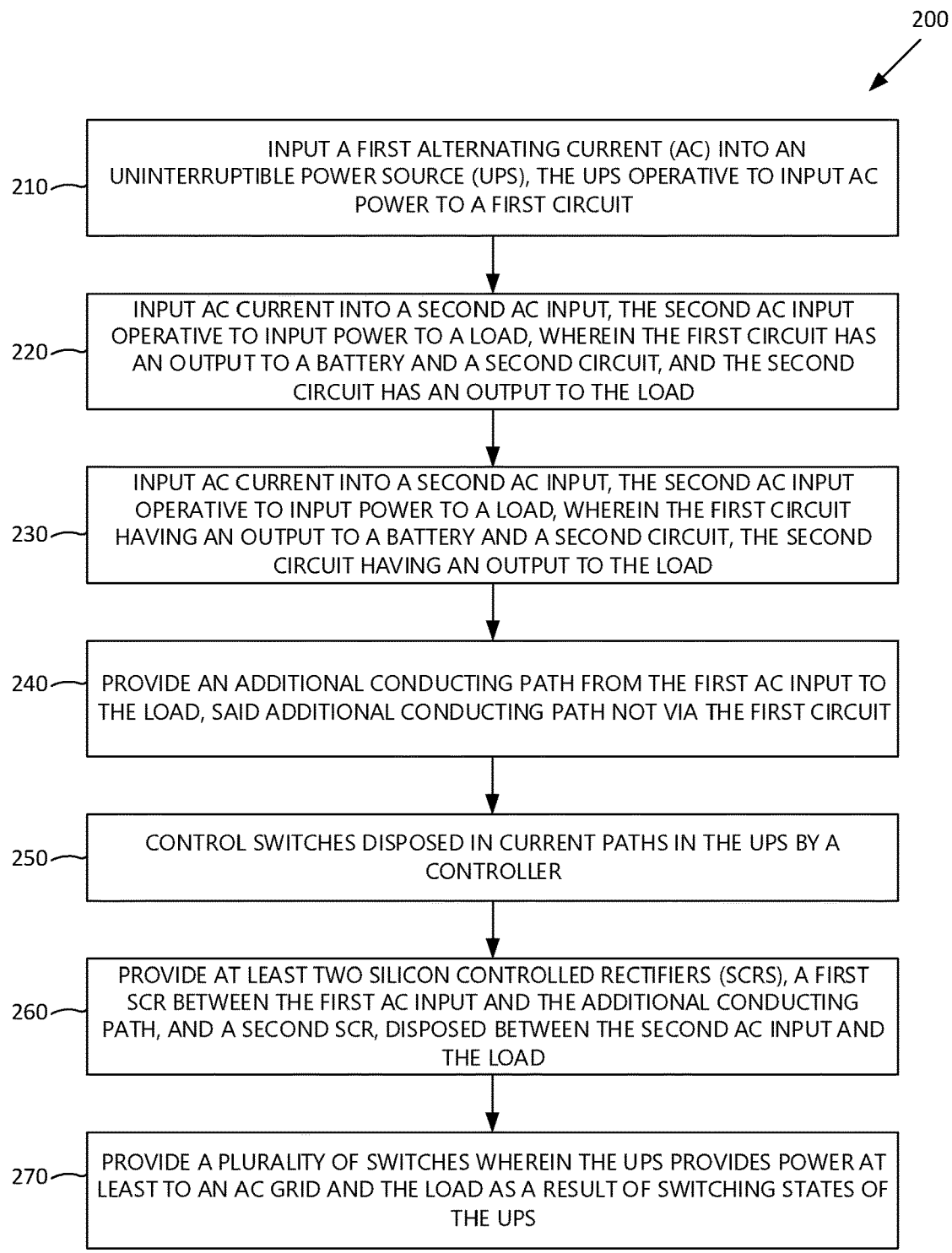
FIG. 2 is a flow chart of an example method for operating a UPS.

Reference is now made to FIG. 2, which is a flow chart 200 of a method for implementing the UPS of FIG. 1. In step 210 a first alternating current (AC) is input into an uninterruptible power source (UPS), the UPS being operative to input AC power to a first circuit, e.g., the first circuit having a DC terminal connected to a battery. In step 220, AC current is input into a second AC input, the second AC input operative to input power to the load 150, e.g., SW2 and SW2.1 are closed, and current flows to the load 150 via terminal 190. the In step 230 AC current is input into the second AC input, the second AC input being operative to input power to the load 150, e.g., SW2 and SW2.1 are closed, and current flows to the load 150 via terminal 190, as described above with reference to step 220. Further, the first circuit may provide power to the battery 130 when SW1 and SW1.1 are closed providing power to the first power converter 120, which converts AC electricity received on the AC terminal from the first AC electricity input to DC electricity on the DC terminal. The second circuit has an output to the load 150. In step 240, SW3 is closed, a conduction path is provided from the first AC input to the load 150, said conduction path not via the first circuit (e.g., bypassing the first circuit may be bypassed via SW3). In step 250 switches disposed in current paths in the UPS may be controlled by a controller. In step 260 at least two SCRs may be provided. More specifically, a first SCR is provided between the first AC input and the conduction path. A second SCR is provided, which is disposed between the second AC input and the load 150. In step 270 a plurality of switches may be provided, wherein the UPS provides power at least to an AC grid and the load 150 as a result of switching states of the plurality of switches.

Figure 3:
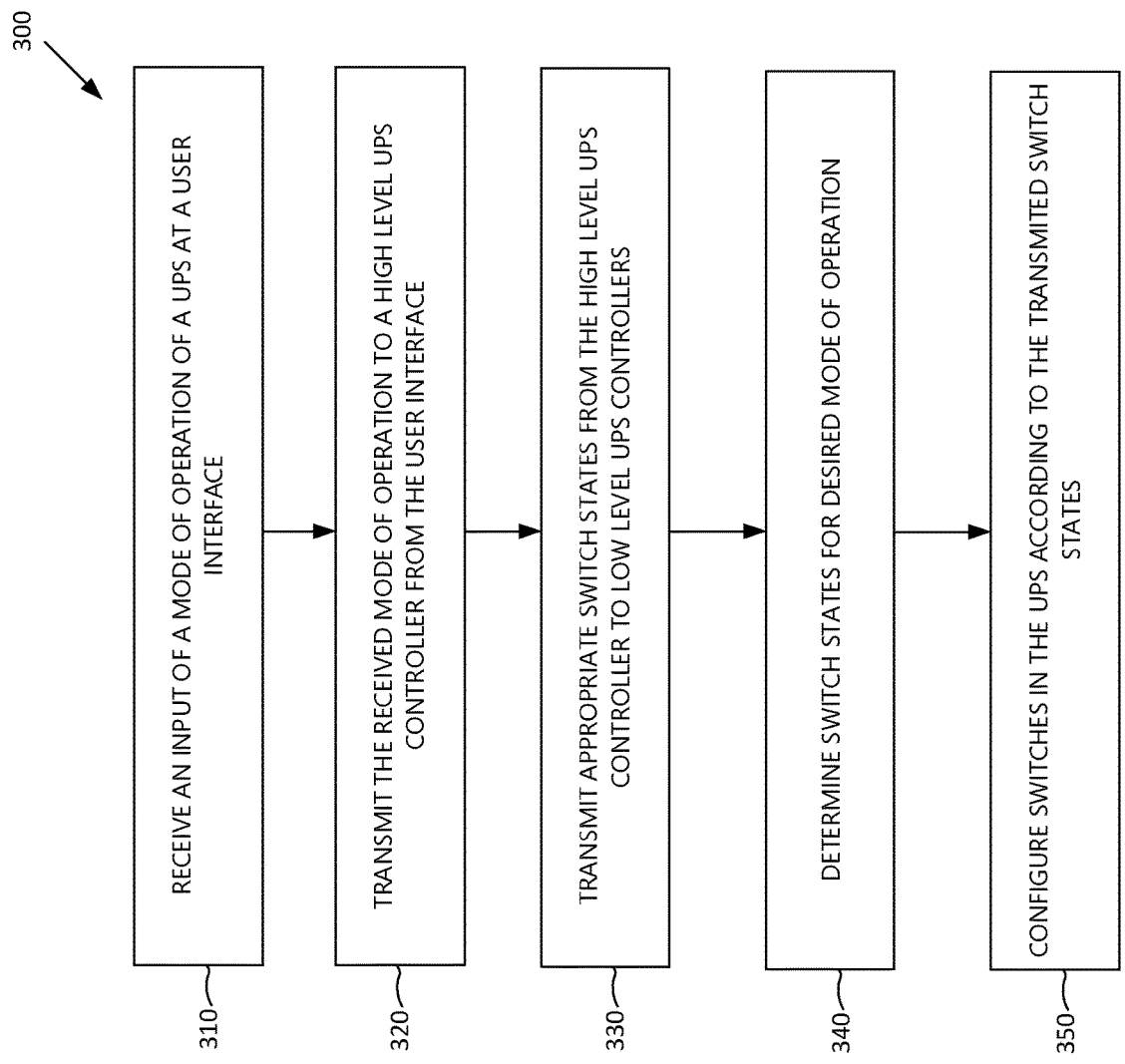
FIG. 3 is a flow chart of an example method for controlling modes of operation of a UPS.

Reference is now made to FIG. 3, which is a flow chart 300 of a method for controlling modes of operation of the UPS of FIG. 1. An input is received at the UI 180, the input including at least a desired mode of operation selected by a user of the UPS 100 (step 310). The desired mode of operation may be provided by the user providing direct input to the UI 180, over a wired or wireless communication interface, or the input is provided by a device which itself has computing or processing capability. For example, the user may either press a button or combination of buttons directly on the UPS 100 in order to configure the desired mode of operation of the UPS 100. In an alternative method, the user may (in step 310) configure the desired mode of operation of the UPS 100 using a touch screen on an outer case of the UPS 100. In still another method of inputting the desired mode of operation, the user may interface with an application on a mobile computer (e.g., a cell phone or tablet computer), which then will wirelessly (e.g, via Bluetooth or WiFi) send a configuration command to the UPS 100. Alternatively or additionally, a desk top computer may be used as an interface by which the user may select mode of operation of the UPS 100. The desk top computer may (in step 310), via a wireless or wired connection, e.g., an Ethernet connection (to an Ethernet terminal not depicted in FIG. 1, for example, of controller 170), transmit the configuration command to the UPS 100.

In another example, a computer may comprise hardware, software, or a combination thereof, for monitoring at least one UPS. The computer may select a mode of operation based on internal logic by which it operates in order to select a mode of operation of the UPS. For example, upon activation, the computer may select Normal mode of operation. After, for example, 48 hours during which the UPS does not provide power to the load, the computer may then opt to select to operate the UPS in Energy Storage mode, double power. Thus, after a certain level of stability is indicated in the system, for example, the computer may be programmed to allow the UPS to provide power to the grid. For example, when the grid is not providing power to the first or the second AC terminal, the UPS may use the first of second power converter to provide power to the grid.

The received desired mode of operation may be transmitted from the user interface 180 to the high level controller 170 of the UPS 100 (step 320). Switch states, as described above in the discussion of FIG. 1, for the desired mode of operation are determined by the high level controller 170 at step 340 (e.g., by retrieving the states from a look up table stored in computer memory). The high level controller 170 of the UPS 100 may optionally transmit the determined switch states to the lower-level controllers 172, 174, 176 (step 330). The lower-level controllers 172, 174, 176 and/or the high level controller 170 may then configure the switches in the UPS according to the determined switch states (step 350).

Figure 4:
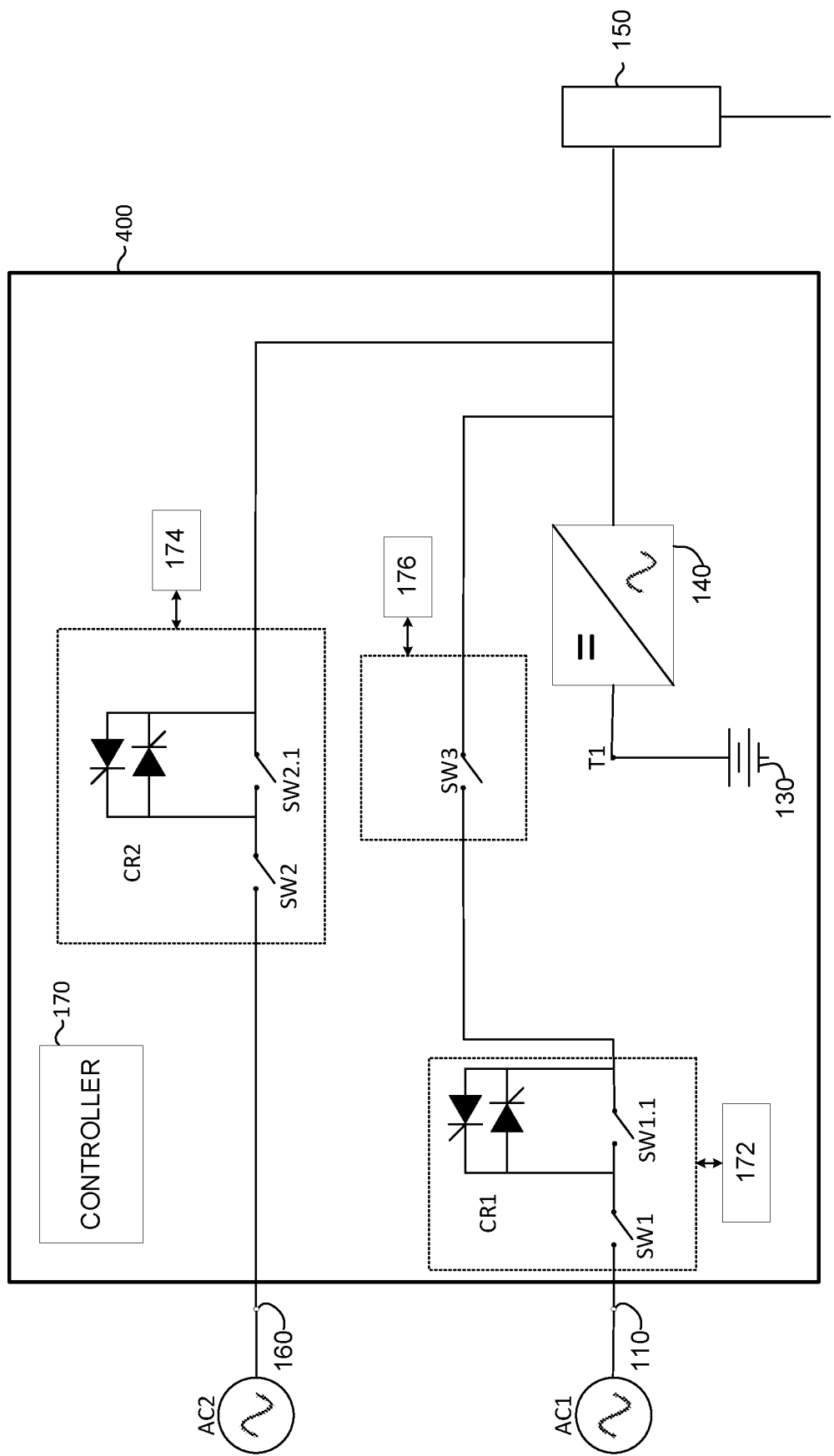
FIG. 4 shows a second example of a UPS.

Reference is now made to FIG. 4, which shows a variation of the UPS 400 constructed in accordance with the present disclosure. The UPS 400 of FIG. 4 in general operates with the same or similar way as the UPS 100 of FIG. 1, and may have similar operational states as the operational states of UPS 100 of FIG. 1 described above. FIG. 4 shows a topology in which, for example, the first input terminal 110 may be configured and designed to receive a first AC electricity input from the grid. The second terminal 160 may be configured and designed to receive a second AC electricity input from an alternative supply of AC electricity, for example, a gasoline, propane, natural gas, or diesel generator, wind turbine, or inverter connected to a photovoltaic power source. It may be the case when there are two distinct sources of AC electricity that the two sources might not be in synchrony with one another. More specifically, wave forms from the alternative supply of AC electricity, should match (for example in voltage, phase and/or frequency) the waveforms of AC electricity from the grid. That is, the AC electricity received at the second terminal 160 should match the AC electricity received at the first terminal 110 in voltage, frequency, phase, and (in case of multiple phases) phase sequence. The UPS may isolate one generator of AC electricity (e.g., form a generator) from the second source of AC electricity (e.g., grid)) until it is within a predetermined tolerance of the phase, frequency, and amplitude of the second source of AC electricity. Isolation of a source of AC electricity may be achieved in the system described herein, by opening of switches SW1, SW1.1, SW2, and/or SW2.1.

Figure 5:
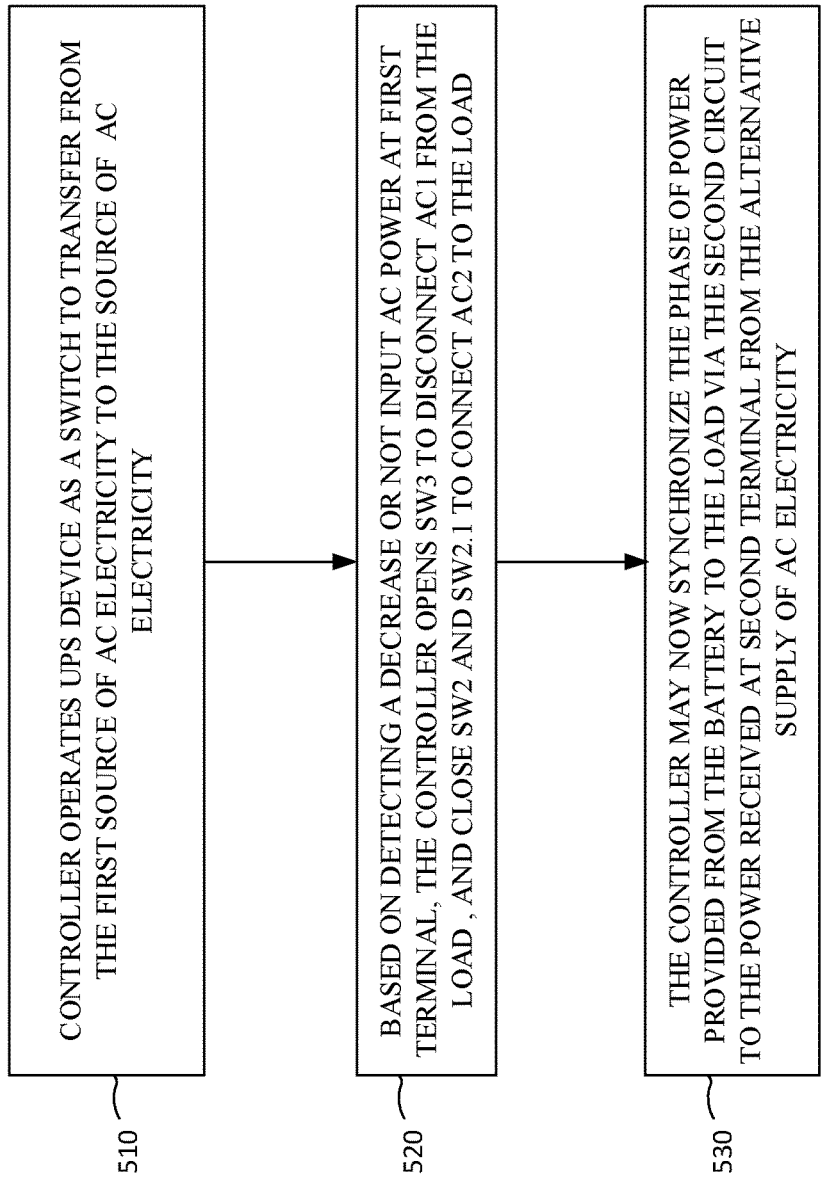
FIG. 5 is a flow chart of operation of the UPS device 400 as a switch.

Reference is now made to FIG. 5 which is a flow chart of operation of the UPS device 400 as a switch. In such a case as described in FIG. 4, the controller 170 may operate the UPS device 400 of FIG. 4 as a switch in order to seamlessly transfer from the first source of AC electricity to the second source of AC electricity (step 510). For example, in the event of a power outage, the first source of AC electricity received at the first terminal 110 might no longer provide an input AC power. Based on detecting a decrease in or no input AC power at first terminal 110, the controller 170 may open SW3 to disconnect AC1 from the load 150, and close SW2 and SW2.1 to connect AC2 to the load 150, thus maintaining flow of AC electricity to the load (step 520). The controller 170 may then synchronize the phase of power provided from the battery 130 to the load 150 via the second circuit 140 to the power received at second terminal 160 from the alternative supply of AC electricity (step 530).

Figure 6:
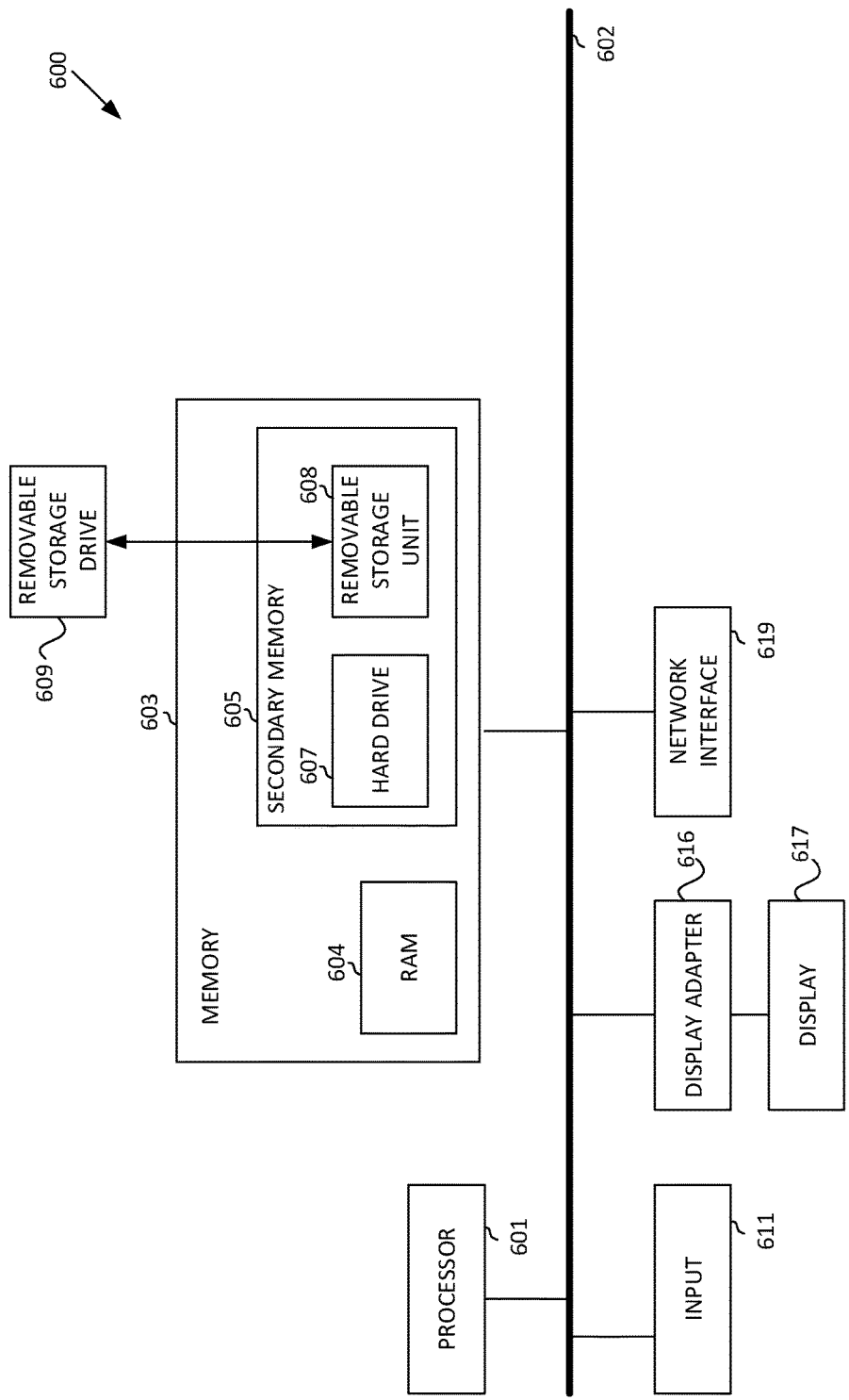
FIG. 6 is an example block diagram of an architecture of a controller for a UPS such as the UPS of FIG. 1 or 4.

Reference is now made to FIG. 6, which is an example block diagram of an architecture of a controller 600 for a UPS such as UPS 100 or 400. The controller 600 may comprise one or more processors, such as processor 601, providing an execution platform for executing machine-readable instructions such as software. One of the processors 601 may be a special purpose processor operative for executing the operations of the UPS controller (e.g., as in 170, 172, 174, or 176).

Commands and data from the processor 601 may be communicated over a communication bus 602. The controller 600 may include a main memory 603, such as a Random Access Memory (RAM) 604, where machine readable instructions may reside during runtime, and a secondary memory 605. The secondary memory 605 may include, for example, a hard disk drive 607 and/or a removable storage drive 608 (which may be not generally accessible on a regular basis, but possibly accessible by service personnel or installers, etc.), such as a floppy diskette drive, a magnetic tape drive, a compact disk drive, a flash drive, etc., or a nonvolatile memory where a copy of the machine readable instructions or software may be stored. The secondary memory 605 may also include ROM (read only memory), EPROM (erasable, programmable ROM), EEPROM (electrically erasable, programmable ROM). In addition to software, data relevant to the operation of the UPS 100, 400 as described herein above, or other similar data may be stored in the main memory 603 or the secondary memory 605. The removable storage drive 608 may read from or write to a removable storage unit 609.

A user may interface with the UPS controller 600 via the user interface (as described above with reference to FIG. 1A which includes input devices 611, such as a touch screen, a keyboard, a mouse, a stylus, and the like, as well as interfaces for input via the wireless interface, in order to provide user input data or other commands. A display adaptor 616 interfaces with the communication bus 602 and a display 617 and receives display data from the processor 601 and converts the display data into display commands for the display 617.

A network interface 619 is provided for communicating with other systems and devices via a network. The network interface 619 typically includes a wireless interface for communicating with wireless devices in the wireless community. A wired network interface (an Ethernet interface, by way of example) may be present as well. The controller 600 may also comprise other interfaces, including, but not limited to Bluetooth or HDMI.

It is appreciated that one or more of the above-described components of the controller 600 may not be included, or other components may be added. The controller 600 shown in FIG. 6 is provided as an example of a possible platform that may be used, and other appropriate types of platforms may be used as alternative platforms. One or more of the steps described above may be implemented as instructions embedded on a computer readable medium and executed on the controller 600. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), hardware registers (e.g., in an ASIC), or magnetic or optical disks or tapes. Examples of computer readable signals, whether modulated using a carrier or not, are signals that a computer system hosting or running a computer program may be configured to access, including signals downloaded through the Internet or other networks. Concrete examples of the foregoing include distribution of the programs on a CD ROM, on a flash drive, or via Internet download. Computer readable medium may further include further include any number of the above mentioned device used in combination, either in a single computer device or multiple computer devices networked together (e.g., cloud based storage).

The skilled person will appreciate that inventive aspects disclosed herein include an apparatus or a system as in any of the following clauses:

Clause 1. An apparatus including an uninterruptible power supply (UPS) including a load terminal, a first alternating current (AC) terminal configured to provided AC power to a first power converter circuit, a second AC terminal, configured to provided power to a load terminal, the first power converter circuit connected to a battery and to a second power converter circuit, the second power converter circuit connected to the load terminal, a first switch circuit disposed between the first AC terminal and the first power converter circuit, a second switch circuit disposed between the second AC terminal and the load terminal, and one or more controllers configured to control the first switch circuit, the second switch circuit, the first power converter circuit, and the second power converter circuit, wherein the one or more controllers are configured to operate the first switch circuit, the second switch circuit, the first power converter circuit, and the second power converter circuit in a plurality of operating modes.

Clause 2. The apparatus according to clause 1, wherein the first power converter circuit is configured to convert direct current (DC) power to alternating current (AC) power.

Clause 3. The apparatus according to either of clauses 1 and 2, wherein the first power converter circuit is configured to convert AC power to DC power.

Clause 4. The apparatus according to any of clauses 1-3, wherein the second power converter circuit is configured to convert AC power to DC power.

Clause 5. The apparatus according to any of clauses 1-4, wherein the second power converter circuit is configured to convert DC power to AC power.

Clause 6. The apparatus according to any of clauses 1-5, wherein the first switch circuit includes a first switch, a second switch, and a first SCR, wherein the first switch and second switch are disposed in series between the first AC terminal and the first power converter, and wherein the first SCR is disposed in parallel to the second switch.

Clause 7. The apparatus according any of clauses 1-6, wherein the second switch circuit includes a third switch, a fourth switch, and a second SCR, wherein the third switch and the fourth switch are disposed between the second AC terminal and the load terminal, and wherein the second SCR is disposed in parallel to the fourth switch.

Clause 8. The apparatus according to any of clauses 1-7, further including a fifth switch connected between the first switch circuit and the load terminal.

Clause 9. The apparatus according to clause 8, wherein the plurality of operating modes includes a first mode, wherein when in the first mode, the one or more controllers are configured to set the first switch in a closed state, the second switch in a closed state, the first SCR in a non-operative state, the third switch in a closed state, the fourth switch in an open state, the second SCR in a non-operative state, and the fifth switch in an open state.

Clause 10. The apparatus according to clause 9, wherein the one or more controllers are configured, when operating in the first mode, to operate the first power converter circuit to convert AC power received from the first AC terminal to DC power.

Clause 11. The apparatus according to clause 10, wherein the one or more controllers are configured, when operating in the first mode, to operate the second power converter to convert the DC power to output AC power, and provide the output AC power to the load.

Clause 12. The apparatus according to clause 10 or clause 11, wherein the one or more controllers are configured, when operating in the first mode, to operate the second power converter to convert DC power drawn from the battery to output AC power, and provide the output AC power to the load.

Clause 13. The apparatus according to clause 10 or clause 11, wherein the one or more controllers are configured, when operating in the first mode, to charge the battery with the DC power.

Clause 14. The apparatus according to clause 10 or clause 11, wherein the one or more controllers are configured, when operating in the first mode, to discharge the battery.

Clause 15. The apparatus according to clause 8, wherein the one or more controllers are configured, when operating in a second mode, to operate the first power converter circuit to convert AC power received from the first AC terminal to DC power.

Clause 16. The apparatus according to clause 15 wherein the one or more controllers are configured, when operating in the second mode, to operate the second power converter to be in standby mode.

Clause 17. The apparatus according to clause 15 or clause 16, wherein the one or more controllers are configured, when operating in the second mode, to charge the battery with the DC power.

Clause 18. The apparatus according to any one of clauses 15-17, wherein the one or more controllers are configured, when operating in the second mode, to set the third switch in a closed state to provide AC power from the second AC terminal to the load.

Clause 19. The apparatus according to clause 8, wherein the one or more controllers are configured, when operating in a third mode, to operate the first power converter to convert DC power received from the battery to AC power.

Clause 20. The apparatus according to clause 19, wherein the one or more controllers are configured, when operating in the third mode, to operate the second power converter to convert DC power received from the battery to AC power.

Clause 21. The apparatus according to clause 19 or clause 20, wherein the one or more controllers are configured, when operating in the third mode, to discharge the battery.

Clause 22. The apparatus according to any of clauses 19-21, wherein the one or more controllers are configured, when operating in the third mode, to operate the first power converter to convert the DC power to output AC power, and provide the output AC power to the load.

Clause 23. The apparatus according to any of clauses 19-22, wherein the one or more controllers are configured, when operating in the third mode, to operate the second power converter to convert the DC power to output AC power, and provide the output AC power to the load.

Clause 24. The apparatus according to clause 8, wherein the one or more controllers are configured, when operating in a fourth mode, to operate the first power converter in standby mode.

Clause 25. The apparatus according to clause 24, wherein the one or more controllers are configured, when operating in the fourth mode, to operate the second power converter to convert DC power received from the battery to AC power.

Clause 26. The apparatus according to clause 24 or clause 25, wherein the one or more controllers are configured, when operating in the fourth mode, to discharge the battery.

Clause 27. The apparatus according to clause 24-26, wherein the one or more controllers are configured, when operating in the fourth mode, to operate the second power converter to convert the DC power to output AC power, and to provide the output AC power to the load.

Clause 28. The apparatus according to clause 24-27, wherein the one or more controllers are configured, when operating in the fourth mode, to operate the second power converter to convert the DC power to output AC power, and to provide the output AC power to the load.

Clause 29. The apparatus according to clause 8, wherein the one or more controllers are configured, when operating in a fifth mode or sixth mode, to operate the first power converter to convert DC power received from the battery to AC power.

Clause 30. The apparatus according to clause 8, wherein the one or more controllers are configured, when operating in the fifth mode or the sixth mode, to operate the first power converter to convert AC power received from the first AC terminal to DC power.

Clause 31. The apparatus according to clause 29 or clause 30, wherein the one or more controllers are configured, when operating in the fifth mode or the sixth mode, to operate the second power converter to convert DC power received from the battery to AC power.

Clause 32. The apparatus according to clause 29 or clause 30, wherein the one or more controllers are configured, when operating in the fifth mode or the sixth mode, to operate the second power converter to convert AC power received from the second AC terminal to DC power provided to the battery.

Clause 33. The apparatus according to any of clauses 30-32, wherein the one or more controllers are configured, when operating in the fifth mode or the sixth mode, to discharge the battery.

Clause 34. The apparatus according to any of clauses 30-clause 32, wherein the one or more controllers are configured, when operating in the fifth mode or the sixth mode, to charge the battery.

Clause 35. The apparatus according to any one of clauses 30-34, wherein the one or more controllers are configured, when operating in the sixth mode, to set the third switch in a closed state to provide the AC power to the load.

Clause 36. The apparatus according to clause 8, wherein the one or more controllers are configured, when operating in a seventh mode, to operate the first power converter to convert DC power received from the battery to AC power.

Clause 37. The apparatus according to clause 8, wherein the one or more controllers are configured, when operating in a seventh mode, to operate the first power converter to convert AC power received from the first AC terminal to DC power.

Clause 38. The apparatus according to clause 36 or clause 37, wherein the one or more controllers are configured, when operating in the seventh mode, to operate the second power converter to convert DC power received from the battery to AC power.

Clause 39. The apparatus according to any of clauses 36-38, wherein the one or more controllers are configured t, when operating in the seventh mode, to discharge the battery.

Clause 40. The apparatus according to any of clauses 36-38, wherein the one or more controllers are configured, when operating in the seventh mode, to charge the battery with DC power.

Clause 41. The apparatus according to any of clauses 36-40 wherein, the one or more controllers are configured, when operating in the seventh mode, to operate the first power converter to convert DC power drawn from the battery to output AC power, and to provide the output AC power to the load.

Clause 42. The apparatus according to any of clauses 36-40 wherein, the one or more controllers are configured, when operating in the seventh mode, to route power from the first AC terminal to be provided to the load.

Clause 43. The apparatus according to clause 8, wherein the one or more controllers are configured, when operating in a eighth mode, to operate the first power converter to convert AC power received from the first terminal to DC power.

Clause 44. The apparatus according to clause 8, wherein the one or more controllers are configured, when operating in the eighth mode, to operate the first power converter to convert DC power drawn from the battery to AC power.

Clause 45. The apparatus according to clause 43 or 44, wherein the one or more controllers are configured, when operating in the eighth mode, to operate the second power converter to convert DC power drawn from the battery to AC power.

Clause 46. The apparatus according to any of clauses 43-45, wherein the one or more controllers are configured, when operating in the eighth mode, to discharge the battery.

Clause 47. The apparatus according to any of clauses 43-45, wherein the one or more controllers are configured, when operating in the eighth mode, to charge the battery with DC power.

Clause 48. The apparatus according to any of clauses 43-48, wherein the one or more controllers are configured, when operating in the eighth mode, to operate the second power converter to convert the DC power to output AC power, and to provide the output AC power to the load.

Clause 49. The apparatus according to any of clauses 43-48, wherein the one or more controllers are configured, when operating in the eighth mode, to provide power received from the first AC terminal to the load.

Clause 50. The apparatus according to clause 8, wherein the one or more controllers are configured, when operating in a ninth mode, to operate the first power converter in standby mode.

Clause 51. The apparatus according to clause 50, wherein the one or more controllers are configured, when operating in the ninth mode, to operate the second power converter in standby mode.

Clause 52. The apparatus according to either clause 50 or 51, wherein the one or more controllers are configured, when operating in the ninth mode, to operate the second power converter to convert DC power received from the battery to AC power and provide the AC power to the load.

Clause 53. The apparatus according to either clause 50 or 51, wherein the one or more controllers are configured, when operating in the ninth mode, to operate the second power converter to convert AC power received from the second AC terminal to DC power.

Clause 54. The apparatus according to any of clauses 50-53, wherein the one or more controllers are configured, when operating in the ninth mode, to provide power received from the second AC terminal to the load.

Clause 55. The apparatus according to any of clauses 50-53, wherein the one or more controllers are configured, when operating in the ninth mode, to operate the second power converter to convert DC power drawn from the battery to output AC power, and provide the output AC power to the load.

Clause 56. The apparatus according to clause 8, wherein the one or more controllers are configured, when operating in tenth mode, to operate the first power converter in standby mode.

Clause 57. The apparatus according to clause 56, wherein the one or more controllers are configured, when operating in the tenth mode, to operate the second power converter in standby mode.

Clause 58. The apparatus according to clause 56, wherein the one or more controllers are configured, when operating in the tenth mode, to operate the second power converter in standby mode.

Clause 59. The apparatus according to clause 56, wherein the one or more controllers are configured, when operating in the tenth mode, to operate the second power converter to convert DC power drawn from the battery to output AC power.

Clause 60. The apparatus any of clauses 56-59, wherein the one or more controllers are configured, when operating in the tenth mode, to operate the second power converter to convert the DC power to output AC power, and provide the output AC power to the load.

Clause 61. The apparatus according to any of clauses 56-59, wherein the one or more controllers are configured, when operating in the tenth mode, to operate the second power converter to convert the AC power received at the second AC terminal, to DC power.

Clause 62. The apparatus according to clause 61, wherein the one or more controllers are configured, when operating in the tenth mode, to operate the second power converter to convert the AC power received at the second AC terminal to DC power, and provide the DC power to the battery.

Clause 63. The apparatus according to any of clauses 56-62, wherein the one or more controllers are configured, when operating in the tenth mode, to discharge the battery.

Clause 64. The apparatus according to any of clauses 56-62, wherein the one or more controllers are configured, when operating in the tenth mode, to charge the battery.

Clause 65. The apparatus according to clause 8, wherein the plurality of operating modes includes a second mode, wherein the one or more controllers are configured, when operating in the second mode, to set the first switch in a closed state, the second switch in a closed state, the first SCR in a non-operative state, the third switch in a closed state, the fourth switch in an open state, the second SCR in an operative state, and the fifth switch in an open state.

Clause 66. The apparatus according to clause 8, wherein the plurality of operating modes includes a third mode, wherein the one or more controllers are configured, when operating in the third mode, to set the first switch in an open state, the second switch in an open state, the first SCR in a non-operative state, the third switch in an open state, the fourth switch in an open state, the second SCR in an open state, and the fifth switch in a closed state.

Clause 67. The apparatus according to clause 8, wherein the plurality of operating modes includes a fourth mode, wherein the one or more controllers are configured, when operating in the fourth mode, to set the first switch in an open state, the second switch in an open state, the first SCR in a non-operative state, the third switch in an open state, the fourth switch in an open state, the second SCR in a non-operative state, and the fifth switch in an open state.

Clause 68. The apparatus according to clause 8, wherein the plurality of operating modes includes fifth mode, wherein the one or more controllers are configured, when operating in the fifth mode, to set the first switch in a closed state, the second switch in a closed state, the first SCR in a non-operative state, the third switch in a closed state, the fourth switch in a closed state, the second SCR in a non-operative state, and the fifth switch in an open state.

Clause 69. The apparatus according to clause 8, wherein the plurality of operating modes includes sixth mode, wherein the one or more controllers are configured, when operating in the sixth mode, to set the first switch in a closed state, the second switch in an open state, the first SCR in an operative state, the third switch in a closed state, the fourth switch in an open state, the second SCR in an operative state, and the fifth switch in a closed state.

Clause 70. The apparatus according to clause 8, wherein the plurality of operating modes includes a seventh mode, wherein the one or more controllers are configured, when operating in the seventh mode, to set the first switch in a closed state, the second switch in a closed state, the first SCR in a non-operative state, the third switch in an open state, the fourth switch in an open state, the second SCR in a non-operative state, and the fifth switch in an open state.

Clause 71. The apparatus according to clause 8, wherein the plurality of operating modes includes as eighth mode, wherein the one or more controllers are configured, when operating in the eighth mode, to set the first switch in a closed state, the second switch in a closed state, the first SCR in a non-operative state, the third switch in a closed state, the fourth switch in an open state, the second SCR in a non-operative state, and the fifth switch in an open state.

Clause 72. The apparatus according to clause 8, wherein the plurality of operating modes includes a ninth mode, wherein the one or more controllers are configured, when operating in the ninth mode, to set the first switch in an open state, the second switch in an open state, the first SCR in a non-operative state, the third switch in a closed state, the fourth switch in an closed state, the second SCR in a non-operative state, and the fifth switch in an open state.

Clause 73. The apparatus according to clause 8, wherein the plurality of operating modes includes an tenth mode, wherein the one or more controllers are configured, when operating in the tenth mode, to set the first switch in an open state, the second switch in an open state, the first SCR in a non-operative state, the third switch in a closed state, the fourth switch in an open state, the second SCR in an operative state, and the fifth switch in an open state.

Clause 74 The apparatus according to any of clauses 1-73, wherein the one or more controllers are configured to operate the first switch circuit, the second switch circuit, the first power converter, and the second power converter to receive a power from the first AC terminal and the second AC terminal and provide the power to the load.

Clause 75. The apparatus according to any of clauses 1-74, wherein the one or more controllers are configured to operate the first switch circuit, the second switch circuit, the first power converter, and the second power converter to receive a power from the battery and provide the power to the first AC terminal or the second AC terminal.

Clause 76. A method including inputting a first alternating current (AC) into an uninterruptible power source (UPS) at a first AC terminal, the UPS operative to input AC power into a first power converter, inputting AC current into the UPS at a second AC terminal, the second AC terminal operative to input power to a load, wherein the first power converter having an output to a battery and a second power converter, the second power converter having an output to the load, providing a second conduction path from the first AC terminal to the load, the second conduction path not via the first power converter, controlling switches disposed in current paths in the UPS by a controller, providing at least two silicon controlled rectifiers (SCRs), a first SCR between the first AC terminal and the second conduction path, and a second SCR, disposed between the second AC terminal and the load, and providing a plurality of switches, wherein the UPS provides power at least to an AC grid and the load.

Clause 77. The method according to clause 76, wherein the first power converter includes a first inverter circuit.

Clause 78. The method according to clause 76 or 77, wherein the first power converter includes a first AC-to-DC converter circuit.

Clause 79. The method according to any of clauses 76-78, wherein the second power converter includes a second inverter circuit.

Clause 80. The method according to any of clauses 76-79, wherein the second power converter includes a second AC-to-DC converter circuit.

Clause 81. The method according to any of clauses 76-80, wherein a first switch of the plurality of switches is disposed between the first AC terminal to the load and the first SCR.

Clause 82. The method according to any of clauses 76-81, wherein a second switch of the plurality of switches is disposed in parallel to the first SCR.

Clause 83. The method according to any of clauses 76-82, wherein a third switch of the plurality of switches is disposed along the second conduction path.

Clause 84. The method according to any of clauses 76-83, wherein a fourth switch of the plurality of switches is disposed between the second AC terminal and the second SCR.

Clause 85. The method according to any of clauses 76-84, wherein a fifth switch of the plurality of switches is disposed in parallel to the second SCR.

Clause 86. The method according to any of clauses 76-85, comprising operating the UPS as a bypass mode UPS.

Clause 87. The method according to any of clauses 76-86, comprising operating the UPS as a backup mode UPS.

Clause 88. The method according to any of clauses 76-87, comprising operating the UPS as an Energy Storage System mode UPS.

Clause 89. The method according to any of clauses 76-88, comprising receiving, by the UPS, power from both the first AC terminal and the second AC terminal and outputting the power via the UPS to the load.

Clause 90. An apparatus including an uninterruptible power supply (UPS) including a first alternating current (AC) terminal, which inputs AC power to a first circuit, a second AC terminal, which inputs power to a load, the first circuit having an output to a battery and a second circuit, the second circuit having an output to the load, an additional conduction path from the first AC terminal to the load, the additional conduction path not via the first circuit, a controller, operative to control switches disposed in current paths in the UPS, at least two silicon controlled rectifiers (SCRs), a first SCR between the first AC terminal and the additional conduction path, and a second SCR, disposed between the second AC terminal and the load, and a plurality of switches, wherein the UPS provides power at least to an AC grid and the load as a result of switching states of the plurality of switches.

Clause 91. The apparatus according to clause 90, wherein the first circuit includes a first inverter circuit.

Clause 92. The apparatus according to either clause 90 or 91, wherein the first circuit includes a first rectifier circuit.

Clause 93. The apparatus according to any of clauses 90-92, wherein the second circuit includes a second inverter circuit.

Clause 94. The apparatus according to any of clauses 90-93, wherein the second circuit includes a second rectifier circuit.

Clause 95. The apparatus according to any of clauses 90-94, wherein a first switch of the plurality of switches is disposed between the first AC terminal to the load and the first SCR.

Clause 96. The apparatus according to any of clauses 90-95, wherein a second switch of the plurality of switches is disposed in parallel to the first SCR.

Clause 97. The apparatus according to any of clauses 90-96, wherein a third switch of the plurality of switches is disposed along the additional conduction path.

Clause 98. The apparatus according to any of clauses 90-97, wherein a fourth switch of the plurality of switches is disposed between the second AC terminal and the second SCR.

Clause 99. The apparatus according to any of clauses 90-98, wherein a fifth switch of the plurality of switches is disposed in parallel to the second SCR.

Clause 100. The apparatus according to any of clauses 90-99, wherein the UPS is operating as a bypass mode UPS.

Clause 101. The apparatus according to any of clauses 90-100, wherein the UPS is operating as a backup mode UPS.

Clause 102. The apparatus according to any of clauses 90-101, wherein the UPS is operating as an Energy Storage System mode UPS.

Clause 103. The apparatus according to any of clauses 90-102, wherein the UPS outputs power from the both first AC terminal and the second AC terminal to the load.

Clause 104. A method including receiving an input of a mode of operation of a plurality of modes of operation of an uninterruptible power source (UPS) at a user interface, transmitting the received mode of operation to a high level UPS controller from the user interface, transmitting appropriate switch states from the high level UPS controller to one or more low level UPS controllers, configuring at least one switch in the UPS according to the transmitted appropriate switch states, wherein the appropriate switch states are set so as to configure the USP to operate in the mode of operation received at the user interface.

Clause 105. The method according to clause 104, wherein the UPS includes a first terminal connected to an electricity grid, a first switch disposed between the first terminal and a first pair of silicon controlled rectifiers (SCRs), a second switch parallel to the first pair of SCRs, a third switch, between the first pair of SCRs and the second switch, and a first bidirectional inverter, a battery, a second bidirectional inverter, a second terminal connected to an electricity grid, a fourth switch disposed between the second terminal and a second pair of SCRs, a fifth switch parallel to the second pair of SCRs.

Clause 106. The method according to clause 105, wherein the plurality of modes of operation include a normal mode of operation in which the first switch, the second switch and the third switch are closed, and wherein the normal mode of operation includes the UPS functioning as an on-line UPS.

Clause 107. The method according to any of clauses 105-106, wherein the plurality of modes of operation include a bypass mode of operation in which the first switch, the second switch and the third switch are closed, and a current path is provided into the second pair of SCRs, and wherein the bypass mode of operation includes the UPS functioning as an on-line UPS.

Clause 108. The method according to any of clauses 105-107, wherein the plurality of modes of operation include a backup mode of operation in which the fifth switch is closed, and wherein the backup mode of operation includes the UPS functioning as a standby UPS.

Clause 109. The method according to any of clauses 105-108, wherein the plurality of modes of operation include a energy storage mode, double power mode of operation in which the first switch, the second switch, the third switch, and the fourth switch are closed.

Clause 110. The method according to any of clauses 105-109, wherein the plurality of modes of operation include a energy storage mode, double power with UPS ability mode of operation in which the first switch and the third switch are closed, and a current path is provided into the first pair of SCRs and the second pair of SCRs.

Clause 111. The method according to any of clauses 105-110, wherein the plurality of modes of operation include a partial energy storage mode with a single power UPS in which the first switch, the second switch and the third switch are closed.

Clause 112. An apparatus including a user interface which receives an input of mode of operation of an uninterruptible power source (UPS), a high level UPS controller to which the user interface transmits the received mode of operation, a plurality of switches, each switch of the plurality of switches being configurable to be in at least one of two switching states, and a plurality of low level controllers which control the switching states of each switch of the plurality of switches, based, at least in part, on a transmission of a switch state from the high level UPS controller, wherein the switching states of each switch of the plurality of switches are set so as to configure the UPS to operate in the mode of operation received at the user interface.

Clause 113. The apparatus according to clause 112, wherein the UPS includes a first terminal connected to an electricity grid, a first switch disposed between the first terminal and a first pair of silicon controlled rectifiers (SCRs), a second switch parallel to the first pair of SCRs, a third switch, between the first pair of SCRs and the second switch, and a first bidirectional inverter, a battery, a second bidirectional inverter, a second terminal connected to an electricity grid, a fourth switch disposed between the second terminal and a second pair of SCRs, a fifth switch parallel to the second pair of SCRs.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   operating, using a controller:
   a first switch of a first switching circuit,
   a second switch of the first switching circuit,
   a semiconductor-controlled rectifier (SCR) of the first switching circuit,
   a first switch of a second switching circuit,
   a second switch of the second switching circuit, and
   a SCR of the second switching circuit;
   wherein the SCR of the first switching circuit and the second switch of the first switching circuit are connected in parallel, and wherein the first switch of the first switching circuit is connected in series with the parallel connection of the second switch of the first switching circuit and the SCR of the first switching circuit;
   wherein the SCR of the second switching circuit and the second switch of the second switching circuit are connected in parallel, and wherein the first switch of the second switching circuit is connected in series with the parallel connection of the second switch of the second switching circuit and the SCR of the second switching circuit; and
   wherein the first switching circuit is disposed between a first alternating current (AC) terminal and a first bidirectional power converter, wherein the second switching circuit is disposed between a second AC terminal and a third AC terminal, wherein a direct current (DC) terminal is disposed between the first bidirectional power converter and a second bidirectional power converter, and wherein the second bidirectional power converter is directly connected to the third AC terminal.

2. The method of claim 1, wherein the first AC terminal, the second AC terminal, the third AC terminal, the DC terminal, the first switching circuit, the second switching circuit, the first bidirectional power converter, and the second bidirectional power converter, are incorporated into an uninterruptible power supply (UPS).

3. The method of claim 1, wherein the DC terminal is coupled to at least one battery.

4. The method of claim 1, wherein the step of operating comprises:
   operating the first switch of the first switching circuit in an open state;
   operating the second switch of the first switching circuit in an open state;
   operating the SCR of the first switching circuit in a non-operative state;

operating the first switch of the second switching circuit in an open state;
operating the second switch of the second switching circuit in an open state; and
operating the SCR of the second switching circuit in non-operative state; and
wherein the method further comprises providing power from the DC terminal to the third AC terminal.

5. The method according to claim 4, further comprising operating a fifth switch in a closed state, wherein the fifth switch is disposed between the first switching circuit and the third AC terminal.

6. The method according to claim 4 wherein the DC terminal is electrically connected to the third AC terminal via at least two power converters.

7. The method of claim 1,
wherein the step of operating comprises:
operating the first switch of the first switching circuit in a closed state;
operating the second switch of the first switching circuit in a closed state;
operating the SCR of the first switching circuit in a non-operative state;
operating the first switch of the second switching circuit in a closed state;
operating the second switch of the second switching circuit in a closed state; and
operating the SCR of the second switching circuit in a non-operative state; and
wherein the method further comprises at least one of:
(i) providing power from the second AC terminal to the third AC terminal; and
(ii) providing power from the DC terminal to the first AC terminal.

8. The method of claim 7, further comprising switching between the step (i) and the step (ii).

9. The method of claim 1, wherein the step of operating comprises:
operating the first switch of the first switching circuit in a closed state;
operating the second switch of the first switching circuit in an open state;
operating the SCR of the first switching circuit in an operative state;
operating the first switch of the second switching circuit in a closed state;
operating the second switch of the second switching circuit in an open state;
operating the SCR of the second switching circuit in an operative state; and
operating a fifth switch in a closed state, wherein the fifth switch is disposed between the first switching circuit and the third AC terminal; and
wherein the method further comprises at least one of:
(i) providing power from the second AC terminal to the third AC terminal; and
(ii) providing power from the DC terminal to the third AC terminal.

10. The method of claim 9, wherein the second AC terminal is electrically connected to the third AC terminal.

11. The method of claim 9, wherein the DC terminal is electrically connected to the first AC terminal.

12. The method of claim 1, wherein the step of operating comprises:
operating the first switch of the first switching circuit in a closed state;
operating the second switch of the first switching circuit in a closed state;
operating the SCR of the first switching circuit in a non-operative state;
operating the first switch of the second switching circuit in an open state;
operating the second switch of the second switching circuit in an open state; and
operating the SCR of the second switching circuit in a non-operative state; and
wherein the method further comprises at least one of:
(i) providing power from the first AC terminal to the third AC terminal;
(ii) providing power from the DC terminal to the third AC terminal; and
(iii) providing power from the DC terminal to the first AC terminal.

13. The method of claim 1, wherein the step of operating comprises:
operating the first switch of the first switching circuit in a closed state;
operating the second switch of the first switching circuit in a closed state;
operating the SCR of the first switching circuit in a non-operative state;
operating the first switch of the second switching circuit in a closed state;
operating the second switch of the second switching circuit in an open state; and
operating the SCR of the second switching circuit in a non-operative state; and
wherein the method further comprises at least one of:
(i) providing power from the first AC terminal to the third AC terminal;
(ii) providing power from the DC terminal to the third AC terminal; and
(iii) providing power from the DC terminal to the first AC terminal.

14. The method of claim 13, wherein the first AC terminal and the DC terminal are electrically connected to the third AC terminal.

15. The method of claim 1, wherein the steps of operating comprise:
operating the first switch of the first switching circuit in an open state;
operating the second switch of the first switching circuit in an open state;
operating the SCR of the first switching circuit in a non-operative state;
operating the first switch of the second switching circuit in a closed state;
operating the second switch of the second switching circuit in a closed state; and
operating the SCR of the second switching circuit in a non-operative state; and
further comprising at least one of:
(i) providing power from the DC terminal to the third AC terminal;
(ii) providing power from the DC terminal to the second AC terminal; and
(iii) providing power from the second AC terminal to the third AC terminal.

16. The method of claim 15, further comprising switching between one of: the steps (i), (ii), and (iii) and another one of the steps (i), (ii), and (iii).

17. The method of claim 1, wherein the step of operating comprises:
- operating the first switch of the first switching circuit in a closed state;
- operating the second switch of the first switching circuit in a closed state;
- operating the SCR of the first switching circuit in a non-operative state;
- operating the first switch of the second switching circuit in a closed state;
- operating the second switch of the second switching circuit in an open state; and
- operating the SCR of the second switching circuit in an operative state; and
- wherein the method further comprises providing power from the second AC terminal to the third AC terminal.

18. The method of claim 17, wherein the second AC terminal and the DC terminal are electrically connected to the third AC terminal.

19. The method of claim 17, wherein the step of operating further comprises operating a fifth switch in an open state, wherein the fifth switch is disposed between the first switching circuit and the third AC terminal.

20. The method of claim 1, wherein the controller comprises a plurality of processors.

* * * * *